US012599817B2

(12) United States Patent
Hiraki et al.

(10) Patent No.: US 12,599,817 B2
(45) Date of Patent: Apr. 14, 2026

(54) MOWER, GROUND MAINTENANCE SYSTEM AND GROUND MAINTENANCE METHOD

(71) Applicant: Yamabiko Corporation, Tokyo (JP)

(72) Inventors: Hidenori Hiraki, Tokyo (JP); Koichi Nakatsugi, Tokyo (JP); Yoshiharu Koshikawa, Wavre (BE)

(73) Assignee: Yamabiko Corporation, Tokyo (JP)

( * ) Notice: Subject to any disclaimer, the term of this patent is extended or adjusted under 35 U.S.C. 154(b) by 776 days.

(21) Appl. No.: 17/829,621

(22) Filed: Jun. 1, 2022

(65) Prior Publication Data

US 2022/0386530 A1    Dec. 8, 2022

(30) Foreign Application Priority Data

Jun. 3, 2021    (JP) ................................. 2021-093479

(51) Int. Cl.
*A63B 47/02* (2006.01)
*A01D 101/00* (2006.01)

(52) U.S. Cl.
CPC ........ *A63B 47/021* (2013.01); *A01D 2101/00* (2013.01); *A63B 2047/022* (2013.01)

(58) Field of Classification Search
CPC ........... A63B 47/021; A63B 2047/022; A63B 437/02; A01D 43/063; A01D 34/81;
(Continued)

(56) References Cited

U.S. PATENT DOCUMENTS

| | | | | |
|---|---|---|---|---|
| 453,258 A * | 6/1891 | Hitchcock | ............... | B60R 19/00 |
| | | | | 293/14 |
| 2,643,472 A * | 6/1953 | Merz | ..................... | E02F 3/7627 |
| | | | | 172/815 |

(Continued)

FOREIGN PATENT DOCUMENTS

| | | | | |
|---|---|---|---|---|
| BR | 202014016178 U2 * | 3/2016 | ............. | E01H 5/062 |
| CN | 107801480 A * | 3/2018 | ........... | A01D 43/063 |

(Continued)

OTHER PUBLICATIONS

European Search Report reporting to corresponding European Patent Application No. 22175806.3, mailed Apr. 18, 2024.
(Continued)

*Primary Examiner* — Joseph M Rocca
*Assistant Examiner* — Sunny D Webb
(74) *Attorney, Agent, or Firm* — GRUMBLES LAW PLLC; Brittany Haanan

(57) ABSTRACT

A ground maintenance system having a mower that can include a first traveling unit which can travel on a ground, a first operating unit which can be joined to the first traveling unit and include a blade which can mow grass on the ground, and a guide member provided in front of the first traveling unit. While the first traveling unit travels forward, objects on the ground (for example, balls) in contact with the guide member can move along the guide member. The objects can move laterally and rearward away from the mower. In some embodiments, the ground maintenance system can further include a collector, attached to or separate from the mower, that can collect the objects on the ground.

19 Claims, 6 Drawing Sheets

(58) Field of Classification Search
CPC ...... A01D 34/008; A01D 42/00; A01D 42/02;
A01D 75/185; A01D 75/187; B25J 5/007;
B60R 19/00; B60R 19/54; A01E 5/066
USPC ........................................................ 414/437
See application file for complete search history.

(56) References Cited

U.S. PATENT DOCUMENTS

| | | | | |
|---|---|---|---|---|
| 2,747,306 | A * | 5/1956 | Hasenbuhler | E01H 5/073 37/272 |
| 2,797,502 | A * | 7/1957 | Griffith | E01H 5/04 37/243 |
| 3,064,369 | A * | 11/1962 | Wildes | A01D 42/08 37/243 |
| 3,526,979 | A * | 9/1970 | Ladewski | E01H 5/06 37/278 |
| 3,559,313 | A * | 2/1971 | Firestone | E01H 5/06 37/231 |
| 3,570,227 | A * | 3/1971 | Bellinger | A01D 34/008 56/DIG. 15 |
| 3,657,828 | A * | 4/1972 | Anderson | E01H 5/067 37/274 |
| 3,803,733 | A * | 4/1974 | Ramsey | E01H 5/065 37/274 |
| 4,074,448 | A * | 2/1978 | Niemela | E01H 5/065 37/234 |
| 4,614,048 | A * | 9/1986 | Melby | E01H 5/065 37/280 |
| 4,658,519 | A * | 4/1987 | Quenzi | E01H 5/063 172/275 |
| 4,987,731 | A * | 1/1991 | Cianciulli | A01D 42/02 56/16.7 |
| 5,329,708 | A * | 7/1994 | Segorski | E01H 5/06 37/231 |
| 5,819,444 | A * | 10/1998 | Desmarais | E01H 5/065 37/234 |
| 6,308,505 | B1 * | 10/2001 | Beckett | A01D 42/02 56/400.14 |
| 6,843,001 | B2 * | 1/2005 | Jenne | E02F 3/7618 37/93 |
| 7,540,103 | B2 * | 6/2009 | Broten | E01H 5/06 37/231 |
| 9,051,700 | B2 * | 6/2015 | Summers | E01H 5/063 |
| 9,545,050 | B2 * | 1/2017 | Fichera | A01D 34/001 |
| 11,439,874 | B2 * | 9/2022 | Nakano | A63B 47/021 |
| 11,510,361 | B2 * | 11/2022 | Matus | G05D 1/0038 |
| 11,946,220 | B2 * | 4/2024 | Vigneault | E01H 5/067 |
| 2005/0229437 | A1 * | 10/2005 | Nesseth | E01H 5/066 37/281 |
| 2005/0246926 | A1 * | 11/2005 | Verseef | E01H 5/066 37/281 |
| 2006/0150443 | A1 * | 7/2006 | Angeletti | E01H 5/04 37/241 |
| 2008/0189004 | A1 | 8/2008 | McMurtry et al. | |
| 2012/0311893 | A1 * | 12/2012 | Knott | E01H 5/066 172/265 |
| 2017/0168499 | A1 | 6/2017 | Björn | |
| 2019/0357433 | A1 * | 11/2019 | Fuse | A01D 34/736 |
| 2020/0301436 | A1 * | 9/2020 | Sakai | A63B 47/021 |
| 2020/0375093 | A1 | 12/2020 | Matus et al. | |

FOREIGN PATENT DOCUMENTS

| | | | | | |
|---|---|---|---|---|---|
| DK | 201770870 | A8 * | 11/2018 | | A63B 47/02 |
| EP | 3549426 | A1 | 10/2019 | | |
| EP | 3571917 | A1 | 11/2019 | | |
| GB | 2308048 | A * | 6/1997 | | A01D 34/81 |
| JP | S5019553 | A | 3/1975 | | |
| JP | S62178829 | U | 11/1987 | | |
| JP | S6349009 | A | 3/1988 | | |
| JP | 2015188441 | A | 11/2015 | | |
| JP | 2019201574 | A | 11/2019 | | |
| KR | 100736021 | B1 * | 7/2007 | | A63B 47/024 |
| KR | 20090052653 | A * | 5/2009 | | A63B 47/021 |
| WO | 0074466 | A1 | 12/2000 | | |
| WO | 2021060254 | A1 | 4/2021 | | |
| WO | WO-2022254558 | A1 * | 12/2022 | | A63B 47/021 |

OTHER PUBLICATIONS

Extended European Search Report pertaining to corresponding European Patent Application No. 22175806.3, mailed Nov. 2, 2022.
Office Action pertaining to corresponding Japanese Patent Application No. 2021-093479, drafted Nov. 1, 2024.

* cited by examiner

MOWER, GROUND MAINTENANCE SYSTEM AND GROUND MAINTENANCE METHOD

CROSS-REFERENCE TO RELATED APPLICATION

This application claims the benefit of priority from Japanese Patent Application No. 2021-093479, the entire contents of which are incorporated herein by reference.

The present disclosure relates to a mower, a ground maintenance system, and a ground maintenance method.

BACKGROUND OF THE DISCLOSURE

A mower for mowing grass (lawn) on a ground of a golf driving range includes an operating unit including a blade to mow the grass on the ground, and a traveling unit having the operating unit travel on the ground (for example, EP patent No. 1211924, or JP patent application publication No. 2019-201574).

SUMMARY OF THE DISCLOSURE

A mower described in EP patent No. 1211924 includes a cover covering a lower part of a main body to prevent balls scattered on a ground from being damaged by coming in contact with a blade. However, in this structure, the side surfaces and the upper part of the main body are not covered with the cover. Thus, when the wheels of the mower move up on the balls on the ground, the balls are pushed aside by wheels of the mower to enter the cover. This causes the balls to come in contact with the blade and be damaged by the blade.

A mower described in JP patent application publication No. 2019-201574 includes a cover covering a blade, a lower part of a main body and side surfaces of the main body. This structure does not allow the balls scattered on the ground to come in contact with the blade and prevents balls from being damaged. However, this causes the attachment structure of the cover to be complexed.

When the conventional mowers described above are used for the ground maintenance, the mowers cannot prevent the wheels of the mowers from moving up on the balls. Therefore, a collector has collected the balls on the ground before the mowers mow lawn on the ground. Thus, during the ground maintenance, the mowers are allowed to travel on the ground only after operation of the collector, and thereby an operation time for the whole ground maintenance is made longer.

The present disclosure solves the above issues and is directed to a mower, a ground maintenance system, and a ground maintenance method, which prevent an object on a ground from coming in contact with a blade and a traveling unit from moving up on the object, thereby improving efficiency of the ground maintenance.

The first aspect to solve the above issues is to provide a mower including a traveling unit configured to travel on a ground, an operating unit joined to the traveling unit and including a blade to mow grass on the ground, and a guide member provided in front of at least one of the traveling unit and the operating unit. While the traveling unit travels forward, an object on the ground and in contact with the guide member is configured to move along the guide member.

The second aspect to solve the above issues is to provide a ground maintenance system including a mower and a collector. The mower includes a first traveling unit, a first operating unit including a blade configured to mow grass on a ground, and a first guide member provided in front of at least one of the first traveling unit and the first operating unit. While the first traveling unit travels forward, an object on the ground and in contact with the first guide member is configured to move along the first guide member. The collector includes a second traveling unit and a second operating unit configured to collect and receive the object on the ground. The mower and the collector are configured to travel on the ground simultaneously or sequentially.

The third aspect to solve the above issues is to provide a ground maintenance method with a mower and a collector. The mower and the collector travel on the same ground simultaneously or sequentially. The collector collects an object on the ground and receives the object into a container of the collector, and the mower mows grass on the ground by a blade of the mower. At this time, the object, on the ground and in contact with a guide member provided on the front-end of the mower in a traveling direction of the mower, moves along the guide member.

In the present disclosure, the guide member of the mower pushes aside the object on the ground to prevent the object from coming in contact with the blade and being damaged. Further, the guide member prevents the mower from moving up on the object on the ground. In this way, even when the objects are scattered on the ground, the mower mows the grass on the ground. This configuration of the present disclosure efficiently performs mowing grass by the mower and collecting the objects by the collector simultaneously or sequentially. This improves the operation efficiency of the ground maintenance.

DESCRIPTION OF THE EMBODIMENTS

Figure 1:
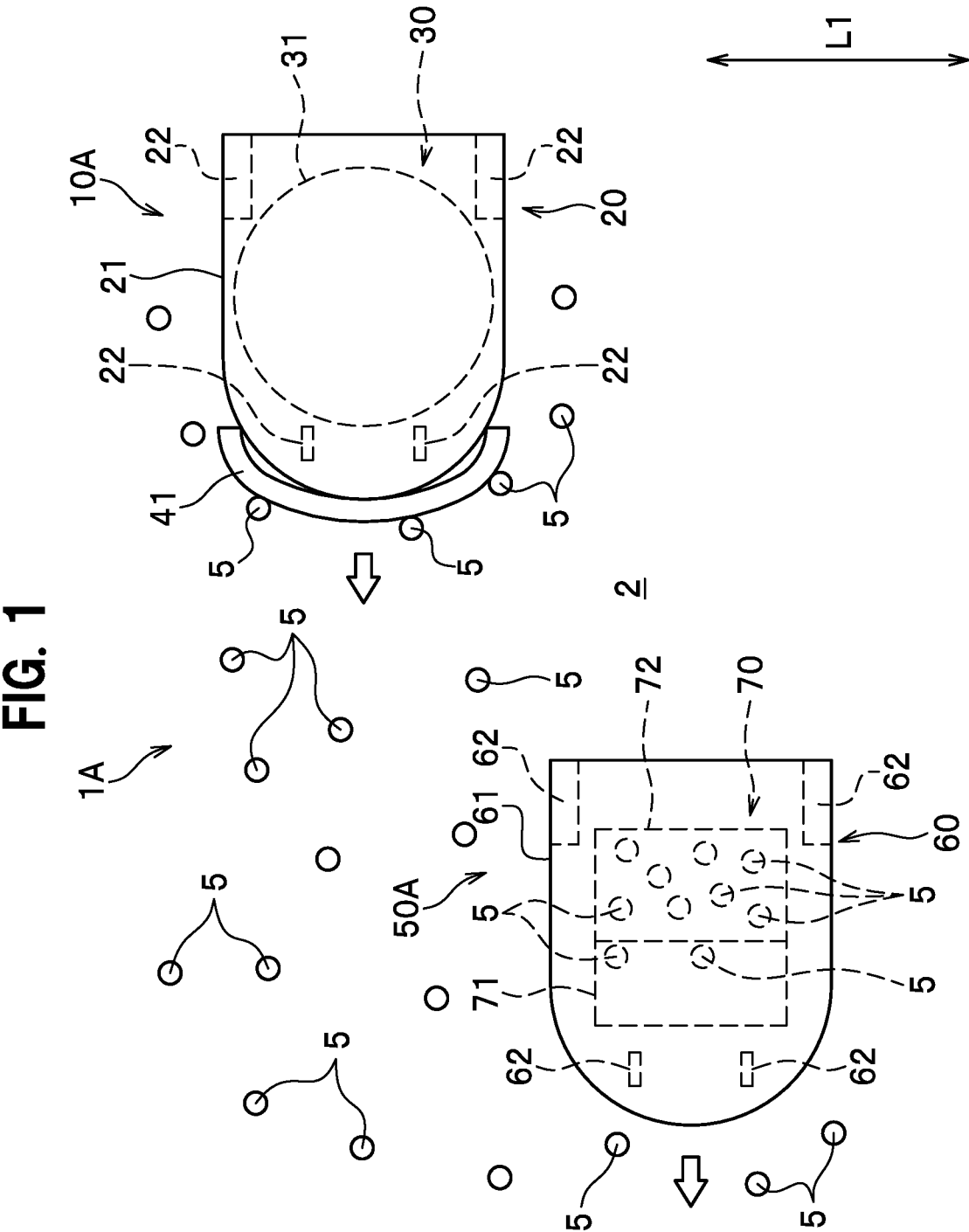
FIG. 1 is a plan view showing an example of a ground maintenance system according to a first embodiment of the present disclosure.

Examples of embodiments of this disclosure will be described in detail with reference to the drawings as appropriate. Note that, in the following description of the embodiments, identical components are given the same reference numerals, and duplicate descriptions are omitted. In the following embodiments, a mower, a ground maintenance system, and a method of ground maintenance of the present disclosure will be described as applied for a golf driving range (a ballpark).

First Embodiment

Figure 2:
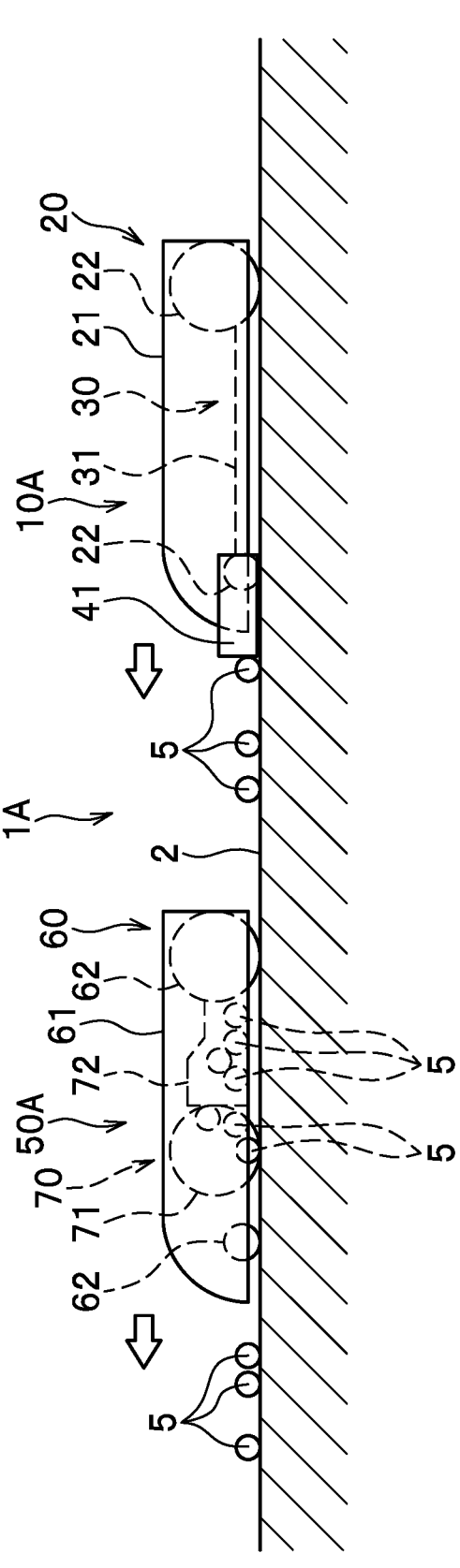
FIG. 2 is a side view showing an example of the ground maintenance system according to the first embodiment of the present disclosure.

A ground maintenance system 1A of the first embodiment, as shown in FIGS. 1 and 2, includes a mower 10A for mowing grass (lawn) on a ground 2 and a collector 50A for collecting balls 5 ("an object" in claims) on the ground 2. The mower 10A and the collector 50A are allowed to travel together on the ground 2 simultaneously or sequentially.

The mower 10A is a vehicle to mow the grass while traveling on the ground 2. The mower 10A includes a first traveling unit 20 to travel on the ground 2, a first operating unit 30 including a blade 31 to mow the grass, and a first guide member 41 provided on the first traveling unit 20. The first operating unit 30 is joined to the first traveling unit 20. In the mower 10A of the first embodiment, the first traveling unit 20 and the first operating unit 30 are integrated together.

The first traveling unit 20, as shown in FIG. 1, includes a body 21 and four wheels 22 provided at the four corners of the front and rear of the right and left of the body 21. The first operating unit 30 rotates the blade 31 provided under the middle of the body 21 to mow the grass on the ground 2. The body 21 is equipped with a driving unit (not shown) such as a motor or an engine, for rotating the blade 31 and driving the wheels 22 of the first traveling unit 20.

The mower 10A includes a controller provided on the body 21. The mower 10A is configured such that the controller has the first traveling unit 20 and the first operating unit 30 driven to autonomously travel on the ground 2 based on location information created with a Global Navigation Satellite System (GNSS) such as GPS or a millimeter-wave radar. The mower 10A can be configured to drive the first traveling unit 20 and the first operating unit 30 with a remote control by a transmitter.

The first traveling unit 20 includes the guide member 41 in front of the body 21. The balls 5 on the ground 2 come in contact with the first guide member 41 before contacting with the wheels 22 of the first traveling unit 20 and the blade 31 of the first operating unit 30. This prevents the balls 5 from coming in contact with the blade 31 and the wheels 22 from moving up on the balls 5 on the ground 2. The guide member 41 extends in a lateral (right-left) direction (denoted by L1 in FIG. 1) and directs the balls 5 on the ground 2, which moves along the guide member 41, to the right or left, and thus the balls 5 move away from the body 21. Note that the guide member 41 can have any materials, such as a metal, a resin, and an elastic material.

The first guide member 41 is fixed on a front-end surface of the body 21. Both the right and left ends of the first guide member 41 project outside from the outer-ends of the wheels 22 in the lateral direction. Thus, the balls 5 are forced to move outward away from the outer-ends of the right and left wheels 22, 22 and this prevents the balls 5 from coming in contact with the wheels 22.

The first guide member 41 of the first embodiment curves in a way such that it extends rearward as extending from the center in the lateral direction thereof toward both the ends in the lateral direction thereof. In other word, the first guide member 41 is provided along the side of the body 21.

According to the configuration, while the mower 10A travels forward, the balls 5, which are on the ground and in contact with the first guide member 41, smoothly move rearward from the right and the left of the mower 10A. This prevents the balls 5 from remaining around the guide member 41 and allows the balls 5 to move away in the opposite direction to the traveling direction. This configuration is effective when the body 21 hits the balls 5 one after another, specifically, when many balls 5 are scattered on the ground 2.

While the mower 10A travels forward with the first traveling unit 20 and the balls 5 on the ground 2 come in contact with the front surface of the first guide member 41, the balls 5 move along the front surface of the guide member 41 in the lateral direction and move outward away from the wheels 22. In this way, the mower 10A travels forward while pushing aside the balls 5 on the ground 2 with the guide member 41.

The collector 50A is a vehicle to collect and receive the balls 5 as plural objects scattered on the ground 2 while traveling on the ground 2. The collector 50A includes a second traveling unit 60 to travel on the ground 2 and a second operating unit 70 to collect and receive the balls 5 on the ground 2. The second operating unit 70 is joined to the second traveling unit 60. In the collector 50A of the first embodiment, the second traveling unit 60 and second operating unit 70 are integrated together.

The second traveling unit 60 includes a body 61; and four wheels 62 provided at the four corners of the right and left of the front and rear of the body 61.

The second operating unit 70 includes a drum 71 to collect the balls 5 on the ground 2 and a container 72 capable of receiving the plural balls 5. The drum 71 and the container 72 are arranged at the center, in the longitudinal direction, of the body 61.

The drum 71 is a cylindrical member to rotate about the lateral directional axis. The drum 71 is rotated to pick up the balls 5 on the ground 2 with a groove at an outer circumference of the drum 71. The container 72 is a tank capable of receiving the plural balls 5. The balls 5 picked up from the ground 2 are sent into the container 72 from the drum 71. The container 72 includes a discharge mechanism to discharge the balls 5 outside the body 61.

The body 61 is equipped therein with a driving unit (not shown) such as a motor or an engine to drive the wheels 62 of the second traveling unit 60 and to move up and down the drum 71.

The collector 50A includes a controller which is provided on the body 61 and drives the second traveling unit 60 and the second operating unit 70 based on location information created with a Global Navigation Satellite System (GNSS) such as GPS or a millimeter-wave radar to travel autonomously on the ground 2. The collector 50A can be configured to drive the second traveling unit 60 and the second operating unit 70 with a remote control by a transmitter.

Next, a maintenance method for the ground 2 located in a golf driving range will be described using the ground maintenance system 1A. In the first embodiment, as shown in FIGS. 1 and 2, the mower 10A and the collector 50A travel simultaneously on a ground 2. At this time, when the mower 10A is controlled such that the mower 10A travels over an area which the collector 50A has passed through, the mower 10A does not hit the balls 5. Further, the mower 10A can travel while following the collector 50A.

While traveling on the surface of the ground 2, the collector 50A collects the balls 5 on the ground 2 with the drum 71 and receives the balls into the container 72. When the collector 50A has collected many balls 5 in the container 72, the collector 50A goes to a discharge area provided inside or outside the ground 2 to discharge the balls 5 received in the container 72.

While traveling on the surface of the ground 2, the mower 10A mows the grass on the ground 2 with the blade 31. At this time, while traveling forward (traveling direction), the mower 10A pushes aside the balls on the ground 2 with the guide member 41.

In this way, while simultaneously traveling on the ground 2, the mower 10A and the collector 50A maintain the ground 2 by collecting the balls 5 scattered on the ground 2 and mowing the grass on the ground 2 simultaneously.

In the mower 10A, the ground maintenance system 1A and the ground maintenance method described above, as shown in FIG. 1, while the mower 10A travels on the ground 2, the guide member 41 of the mower 10A pushes aside the balls 5 on the ground 2. This prevents the balls 5 from coming in contact with the blade 31 and being damaged. This further prevents the wheels 22 of the mower 10A from moving up on the balls 5.

In this way, even when the balls 5 are scattered on the ground 2, the mower 10A is allowed to mow the grass on the ground 2. Mowing the grass by the mower 10A and collecting the balls 5 by the collector 50A are simultaneously performed and thereby an operation efficiency of the maintenance of the ground 2 is improved.

The first embodiment of the present disclosure has been described above. The present disclosure, however, is not limited to the first embodiment and is appropriately modified in any forms without departing from the scope of the present disclosure. In the first embodiment, the mower 10A is required to include only the guide member 41, but the mower 10A is not required to perform mowing. For example, at times when mowing operation is not required or at times when collecting balls 5 on the ground 2 is prioritized, the mower 10A can be configured to move the balls 5 along the guide member 41 to collect the balls 5 without the mowing operation. This configuration has the collector 50A travel and collect the balls 5 within an area where the many balls 5 are guided to gather and thereby improving the efficiency of the maintenance of the ground 2.

In the first embodiment, as shown in FIG. 1, the mower 10A and the collector 50A travel simultaneously within the ground 2. However, they can travel sequentially within the ground 2. For example, while one of the mower 10A and the collector 50A travels within the ground 2, the other one of them can travel within the ground 2. Further, only one of the mower 10A and the collector 50A travels within the ground 2 and the operation has finished, and then only the other one of them can travel within the ground 2.

Figure 3:
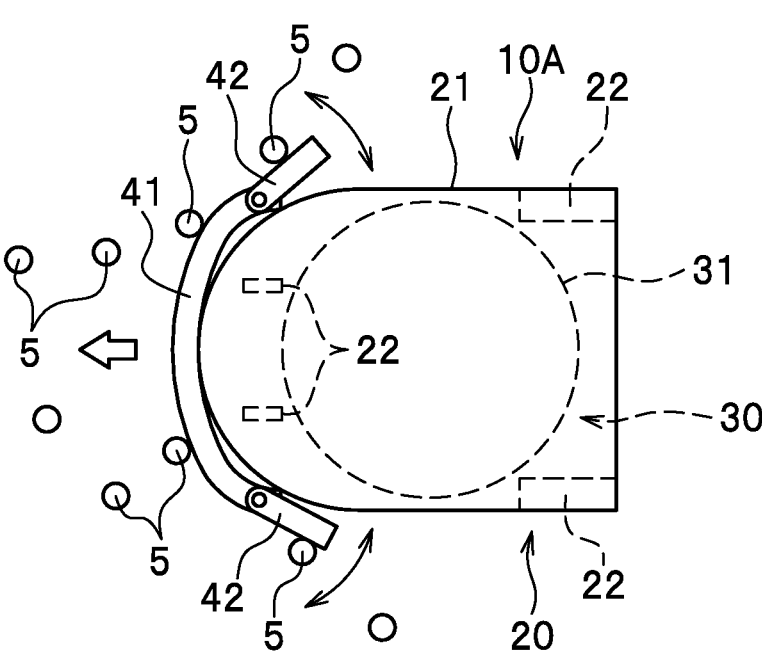
FIG. 3 is a plan view showing a modification of a mower of the ground maintenance system, which includes an inclinable and rotatable end guide, according to the first embodiment of the present disclosure.
Figure 4:
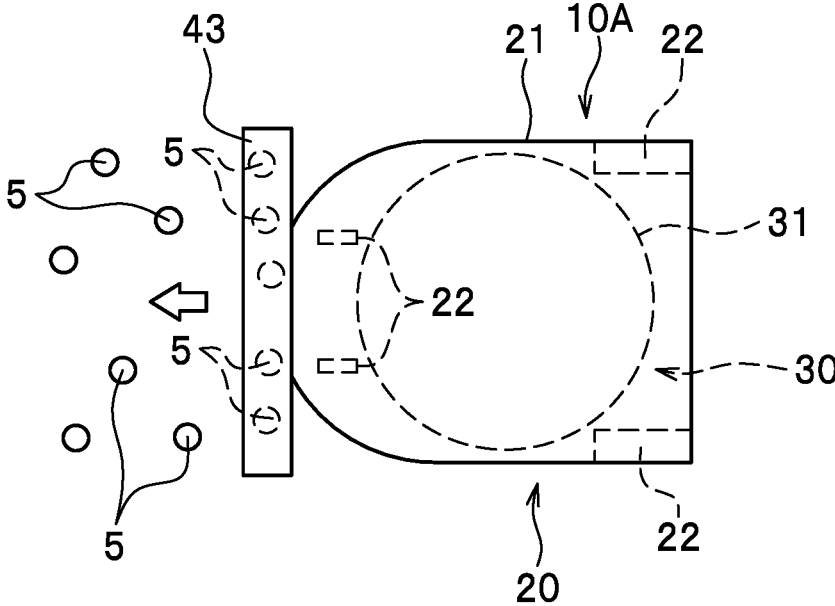
FIG. 4 is a plan view showing a modification of a mower of the ground maintenance system, which includes a guide member capable of collecting a ball, according to the first embodiment of the present disclosure.

The guide member 41 is not limited in terms of its shape and size as long as the guide member 41 pushes aside the balls on the ground 2. For example, as shown in FIG. 3, end guides 42, 42 can be joined to the right-end and the left-end of the first guide member 41, respectively. The end guides 42 rotate about the vertical axis to incline to the first guide member 41. In this configuration, an inclination angle of the end guides 42 to the first guide member 41 is adjusted. This allows a direction of moving the balls 5 pushed aside with the first guide member 41 and the end guides 42 to be adjusted. Further, as shown in FIG. 4, the first guide member 43 can hold the balls 5 while the plural balls move along the first guide member 43. In this case, the ball collecting operation and the mowing operation can be simultaneously performed as one unit. Obviously, depending on a condition of the ground 2, the mower 10A can mow the grass or not.

In the ground maintenance system 1A of the first embodiment, as shown in FIG. 1, only the mower 10A includes the guide member 41. Meanwhile, the collector 50A can include a guide member to guide the balls 5 to the drum 71.

The configuration of the blade 31 and the first traveling unit 20 of the mower 10A is not limited and can employ various conventional devices. Likewise, the collecting mechanism of the collector 50A and the configuration of the second traveling unit 60 are not limited and can employ various conventional devices.

The ground maintenance system 1A of the first embodiment has been described with the ground 2 of a golf driving range. Meanwhile, a type of ground 2 is not limited, for example, the ground maintenance system 1A can be used for collecting objects such as fruits or nuts on a farming ground while mowing grass on the farming ground.

Second Embodiment

Figure 5:
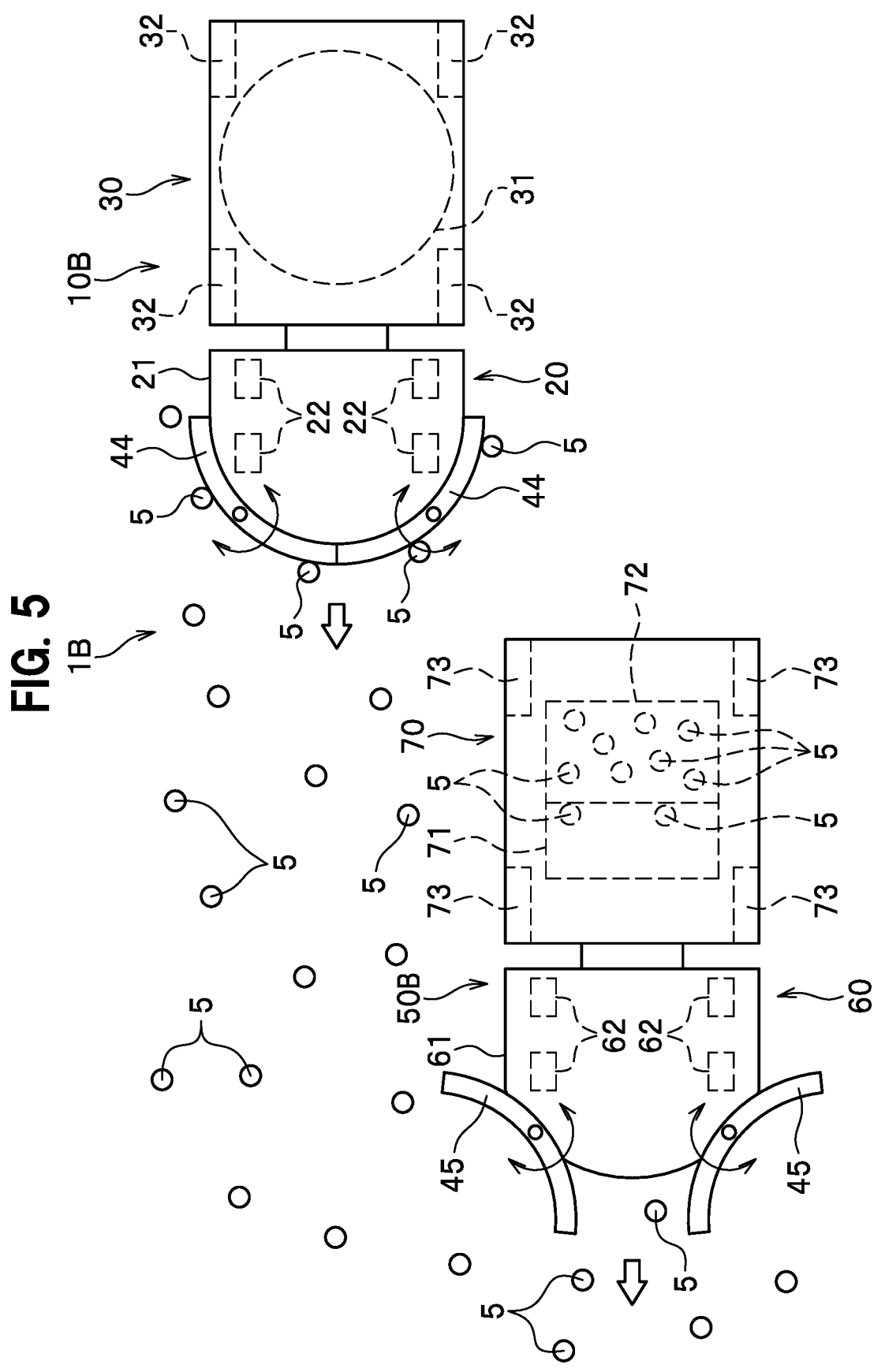
FIG. 5 is a plan view showing an example of a ground maintenance system according to a second embodiment of the present disclosure.

Next, a ground maintenance system 1B of the second embodiment will be described. The ground maintenance system 1B of the second embodiment, as shown in FIG. 5, has almost the identical configuration to the ground maintenance system 1A (as shown in FIG. 1) of the first embodiment. The ground maintenance system 1B differs from the ground maintenance system 1A in that an operating unit and a traveling unit are separate and both a mower and a collector include guide members respectively.

A mower 10B of the second embodiment includes the first traveling unit 20 and the first operating unit 30 separate from each other. The first operating unit 30 is detachably joined to the rear part of the body 21 of the first traveling unit 20. The first operating unit 30 of the second embodiment includes four wheels 32 provided at the four corners of right and left of the front and rear thereof. The first operating unit 30 of the second embodiment is pulled to travel by the first traveling unit 20.

The mower 10B of the second embodiment includes right and left first guide members 44, 44 at the front-end of the body 21. The first guide members 44 of the second embodiment curve such that they extend rearward as extending from the ends closer to the center in the lateral direction thereof toward both the outer-ends thereof. The right and left first guide members 44, 44 of the second embodiment are rotatable about the vertical axis at the center in the lateral direction thereof. Here, the right and left first guide members 44, 44 are rotatable about the vertical axis. Meanwhile, the right and left first guide members 44, 44 can be fixed on the front-end of the body 21 instead.

The right and left first guide members 44, 44 of the mower 10B of the second embodiment are continuous at the center in the lateral direction of the front-end of the body 21. Thereby, while the first traveling unit 20 travels forward, the balls 5 in contact with the front surfaces of the right and left first guide members 44, 44 move along the first guide members 44, 44 outside of the wheels 22.

Further, each outer-end of right and left first guide members 44, 44 of the second embodiment projects outside from the outer-ends of the four wheels 22 provided at the four corners of the front and rear of the right and left of the first traveling unit 20 and the four wheels 32 provided at the four corners of the front and rear of the right and left of the first operating unit 30. This prevents the balls 5 on the ground 2 moved by the first guide member 44 from coming in contact with the blade 31 of the first operating unit 30 which is pulled to travel by the first traveling unit 20. This further prevents the wheels 32 from moving up on the balls 5 on the ground 2.

A collector 50B of the second embodiment includes the second traveling unit 60 and the second operating unit 70 which are configured separately. The second operating unit 70 is detachably joined to the rear part of the body 61 of the second traveling unit 60. The second operating unit 70 of the second embodiment includes four wheels 73 provided at four corners of the front and rear of the right and left thereof. The second operating unit 70 of the second embodiment is pulled to travel by the second traveling unit 60.

The second traveling unit 60 of the collector 50B and the first traveling unit 20 of the mower 10B of the second embodiment have the same configuration and are the same model. Thus, the collector 50B also includes right and left second guide members 45, 45 provided on the front-end of the body 61 of the collector 50B. The second guide members 45 are rotatable about the vertical axis. The second guide members 45 also can be fixed on the front-end of the body 21 without rotating about the vertical axis as shown by the first guide members 44.

The second guide members 45 of the collector 50B of the second embodiment are provided with a posture in which the first guide member 44 of the mower 10B is turned by 180 degrees about the vertical axis or the first guide member 44 is reversed upside down. The right and left second guide members 45, 45 are apart from each other at the center of the front-end in the lateral direction of the body 61. Thereby, while the second traveling unit 60 travels forward, the balls 5 in contact with the front surface of the right and left guide members 45, 45 move along the front surface of the second guide members 45 to the center in the lateral direction. The balls 5 pass through between the second guide members 45, 45 and are guided to the drum 71.

Further, the outer side-ends of the second guide members 45 of the second embodiment project outside from the body 61. In this configuration, the collector has a wider range to collect the balls 5 than a collector without the second guide members 45 and thus collects more balls 5 on the ground 2.

In the ground maintenance system 1B described above, the first traveling unit 20 of the mower 10B is the same model as the second traveling unit 60 of the collector 50B and thus reduces the maintenance cost on the ground 2.

Figure 6:
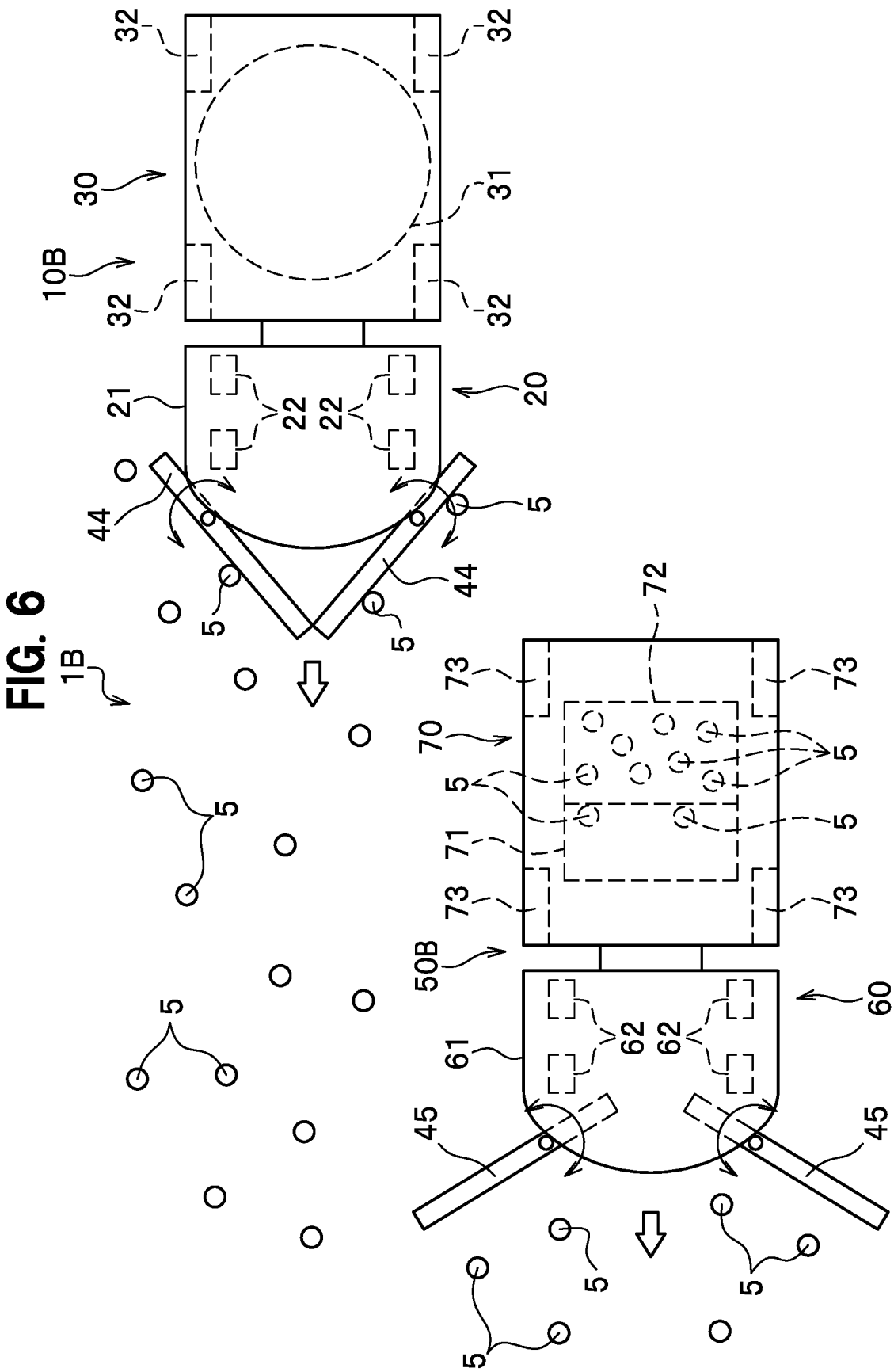
FIG. 6 is a plan view showing a modification of the ground maintenance system, which includes a straight guide member, according to the second embodiment of the present disclosure.

The second embodiment of the present disclosure has been described above. The present disclosure, however, is not limited to the second embodiment and, like the first embodiment, is appropriately modified in any forms without deviation from the scope of the present disclosure. The first guide members 44 and the second guide members 45 of the second embodiment, as shown in FIG. 5, curve in an arc shape. Meanwhile, as shown in FIG. 6, the first guide members 44 and the second guide members 45 can have a straight shape.

Figure 7:
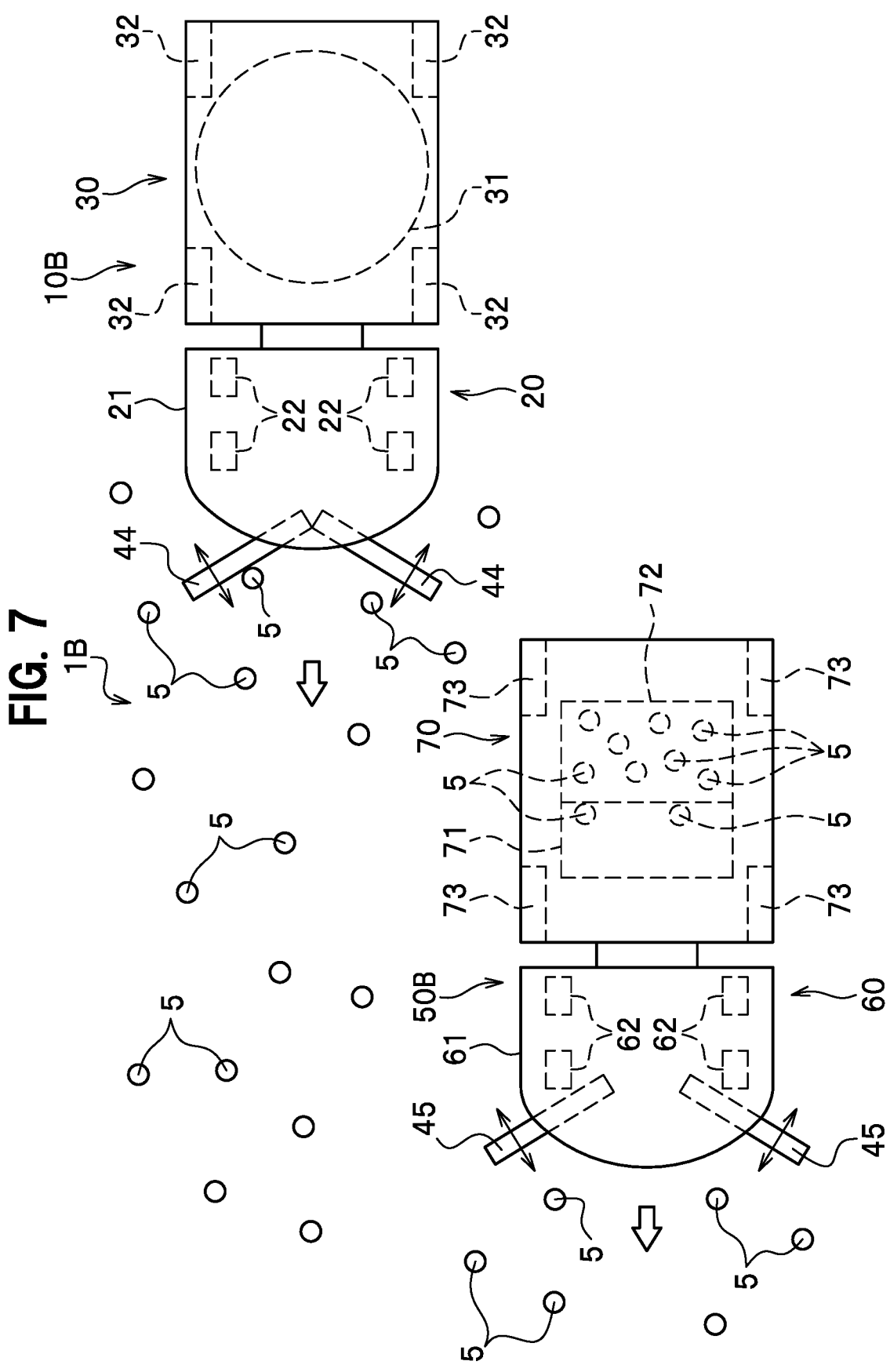
FIG. 7 is a plan view showing a modification of the ground maintenance system, which includes a slidable guide member, according to the second embodiment of the present disclosure.

The first guide members 44 and the second guide members 45 of the second embodiment, as shown in FIG. 5, are configured to rotate about the vertical axis. Meanwhile, as shown in FIG. 7, the first guide members 44 and the second guide members 45 can be slidable in the longitudinal direction. This configuration allows the first guide members 44, in contact with each other, to move obliquely rearward to the outside respectively, as shown by the mower 10B. This allows the second guide members 45, 45 to be separated apart from each other, as shown by the collector 50B.

In the ground maintenance system 1B of the second embodiment, as shown in FIG. 5, the first traveling unit 20 includes the guide members 44. Meanwhile, the first operating unit 30 can include the first guide members 44. Likewise, the second traveling unit 60 includes the second guide members 45. Meanwhile, the second operating unit 70 can include the second guide members 45.

In the ground maintenance system 1B of the second embodiment, since the first traveling unit 20 and the second traveling unit 60 are the same model, a collector can be constructed by removing the first operating unit 30 from the first traveling unit 20 and attaching the second operating unit 70 to the first traveling unit 20. Further, a mower can be constructed by removing the second operating unit 70 from the second traveling unit 60 and attaching the first operating unit 30 to the second traveling unit 60.

What is claimed is:

1. A mower comprising
a traveling unit configured to travel on a ground in a travel direction,
a first operating unit joined to the traveling unit and comprising a blade to mow grass on the ground, and
a guide member provided in front of at least one of the traveling unit and the first operating unit,
wherein the guide member is horizontally inclinable to the at least one of the traveling unit and the first operating unit,
wherein the guide member is horizontally rotatable to the at least one of the traveling unit and the first operating unit,
wherein the guide member comprises a right guide member including a front right end and rear right end in the travel direction; and a left guide member including a front left end and a rear left end in the travel direction,
wherein each of the right guide member and the left guide member is horizontally rotatable about a vertical axis on each of the right guide member and the left guide member relative to the at least one of the traveling unit and the first operating unit,
wherein the right guide member and the left guide member are configured to horizontally rotate in opposite directions with the front right end and the front left end coming in contact with each other while the rear right end and the rear left end move apart from each other,
wherein while the traveling unit travels forward, the guide member is configured to move an object on the ground that is in contact with the guide member along the guide member and laterally and rearward away from the mower.

2. The mower according to claim 1, wherein
the guide member extends in a lateral direction of the mower, and
while the traveling unit travels forward, the object in contact with the guide member is configured to move along the guide member in the lateral direction.

3. The mower according to claim 2, wherein
the traveling unit comprises right and left wheels, and
the guide member projects past outer-ends of the wheels in the lateral direction.

4. The mower according to claim 1, wherein
the traveling unit and the first operating unit are separate from each other, and the first operating unit is detachably joined to the traveling unit.

5. The mower according to claim 4, comprising
a second operating unit configured to collect and receive the object on the ground, wherein
the second operating unit is joinable to the traveling unit from which the first operating unit is removed.

6. The mower according to claim 1, wherein
the guide member is joined to at least one of the traveling
unit and the first operating unit and is horizontally
rotatable to the at least one unit, and
while the traveling unit travels forward, the object in
contact with the guide member is adjustable in a
moving direction by inclining the guide member to the
at least one unit.
7. A ground maintenance system comprising
a mower and a collector,
wherein
the mower comprises
a first traveling unit,
a first operating unit comprising a blade configured to
mow grass on a ground, and
a first guide member provided in front of at least one of
the first traveling unit and the first operating unit,
wherein the first guide member is horizontally inclinable
to the at least one of the traveling unit and the first
operating unit,
wherein the first guide member comprises a first right
guide member including a first front right end and first
rear right end in the travel direction; and a first left
guide member including a first front left end and a first
rear left end in the travel direction,
wherein each of the first right guide member and the first
left guide member is horizontally rotatable about a
vertical axis on each of the first right guide member and
the first left guide member relative to the at least one of
the first traveling unit and the first operating unit,
wherein the first right guide member and the first left
guide member are configured to horizontally rotate in
opposite directions with the first front right end and the
first front left end coming in contact with each other
while the first rear right end and the first rear left end
move apart from each other,
wherein
while the first traveling unit travels forward, the first guide
member is configured to move an object on the ground
that is in contact with the first guide member along the
first guide member and laterally and rearward away
from the mower, and
the collector comprises
a second traveling unit,
a second operating unit configured to collect and
receive the object on the ground, and
a second guide member provided in front of at least one
of the second traveling unit and the second operating
unit, and rotatable or slidable horizontally to at least
one of the second traveling unit and the second
operating unit,
wherein
the second guide member comprises a second right guide
member and a second left guide member,
the second right guide member and the second left guide
member are apart from each other at a space interval,
the mower and the collector are configured to travel on the
ground simultaneously or sequentially.
8. The ground maintenance system according to claim 7,
wherein
the first traveling unit and the first operating unit are
separate from each other,
the first operating unit is detachably joined to the first
traveling unit,
the second traveling unit and the second operating unit are
separate from each other, and

the second operating unit is detachably joined to the
second traveling unit.
9. The ground maintenance system according to claim 7,
wherein
while the second traveling unit travels forward, the object
in contact with the second guide member is configured
to move along the second guide member.
10. A ground maintenance method using a mower and a
collector, comprising:
having the mower and the collector travel on a ground
simultaneously or sequentially,
collecting an object on the ground by the collector and
receiving the object into a container of the collector,
mowing grass on the ground by a blade of the mower, and
moving the object along a first guide member and
laterally and rearward away from the mower,
wherein the first guide member is horizontally inclin-
able to the mower, wherein the first guide member is
provided on the front-end of the mower in a traveling
direction of the mower while the object on the
ground contacts with the guide member,
wherein the mower comprises
a first traveling unit, and
a first operating unit,
wherein the first guide member comprises a first right
guide member including a first front right end and first
rear right end in the travel direction; and a first left
guide member including a first front left end and a first
rear left end in the travel direction,
wherein each of the first right guide member and the first
left guide member is horizontally rotatable about a
vertical axis on each of the first right guide member and
the first left guide member relative to the at least one of
the first traveling unit and the first operating unit,
wherein the first right guide member and the first left
guide member are configured to horizontally rotate in
opposite directions with the first front right end and the
first front left end coming in contact with each other
while the first rear right end and the first rear left end
move apart from each other, and
the collector comprises
a second traveling unit,
a second operating unit, and
a second guide member provided in front of at least one
of the second traveling unit and the second operating
unit, and rotatable or slidable horizontally to at least
one of the second traveling unit and the second
operating unit,
wherein
the second guide member comprises a second right guide
member and a second left guide member,
the second right guide member and the second left guide
member are apart from each other at a space interval.
11. The mower according to claim 1, wherein
the traveling unit includes a body, and
the guide member is provided along a side of the body of
the traveling unit.
12. The mower according to claim 1, wherein
the right and the left guide members present a continuous
surface where their front ends meet, and
the rear right and left ends of the right and the left guide
members extend rearward along a side of the mower.
13. The mower according to claim 12, wherein each of the
first right and first left guide members are horizontally
rotatable about a vertical axis on each of the two guide
members.

14. The mower according to claim 12, wherein the right and the left guide members are curved arcs.

15. The mower according to claim 12, wherein the right and the left guide members are straight.

16. The ground maintenance system according to claim 7, wherein the first traveling unit includes a body, and the first guide member is provided along a side of the body of the first traveling unit.

17. The ground maintenance system according to claim 7, wherein the first rear right and left ends of the first right and the left guide members extend rearward along a side of the mower.

18. The ground maintenance method using a mower and a collector according to claim 10, wherein the first traveling unit includes a body, and the first guide member is provided along a side of the body of the first traveling unit.

19. The ground maintenance method using a mower and a collector according to claim 10, wherein the first right and the left guide members present a continuous surface where their first front right and left ends meet, and the rear right and left ends of the first right and the first left guide members extend rearward along a side of the mower.

\* \* \* \* \*